No. 626,023. Patented May 30, 1899.
L. HOAGE & A. NYVALL.
LID HOLDER.
(Application filed Dec. 15, 1898.)

(No Model.)

Witnesses:

Inventors
Leon Hoage
Albert Nyvall
by Rich. T. Dyer
Att'y.

UNITED STATES PATENT OFFICE.

LEON HOAGE AND ALBERT NYVALL, OF NEW YORK, N. Y.

LID-HOLDER.

SPECIFICATION forming part of Letters Patent No. 626,023, dated May 30, 1899.

Application filed December 15, 1898. Serial No. 699,315. (No model.)

*To all whom it may concern:*

Be it known that we, LEON HOAGE and ALBERT NYVALL, citizens of the United States, residing in the borough of Brooklyn, city of New York, State of New York, have invented a certain new and useful Improvement in Lid-Holders, of which the following is a specification.

Our invention relates to improvements in lid-holders. Such devices are intended for use in connection with cooking utensils provided with lids, the object of the device being to hold the lid in place while the utensil is tilted for the purpose of draining water therefrom.

The objects of our invention are to provide and produce an improved lid-holder capable of being manufactured very cheaply and adapted for use in connection with all forms of lidded cooking utensils provided with a fixed handle in contradistinction from a bail.

Broadly considered, our invention consists of a lid-holder comprising a handle adapted to be grasped simultaneously with the handle of the utensil, two legs straddling the latter handle and having a fulcrum which bears against the latter and a suitable foot or other continuation of said legs for bearing against the lid, whereby the latter may be held firmly in place when the utensil is tilted.

Our improved lid-holder may be conveniently made of heavy wire bent into the proper forms or of cast metal, as may be desired.

Preferably our improved lid-holder is so constructed as to constitute also a lifter for the stove-lids and also a poker, whereby a very convenient combination-tool will be produced.

By preference also the improved device is so constructed as to be adapted for the lifting of the lids of cooking utensils, which capacity increases its general effectiveness.

In order that our invention may be better understood, attention is directed to the accompanying drawings, forming part of this specification, and in which—

Figure 1:
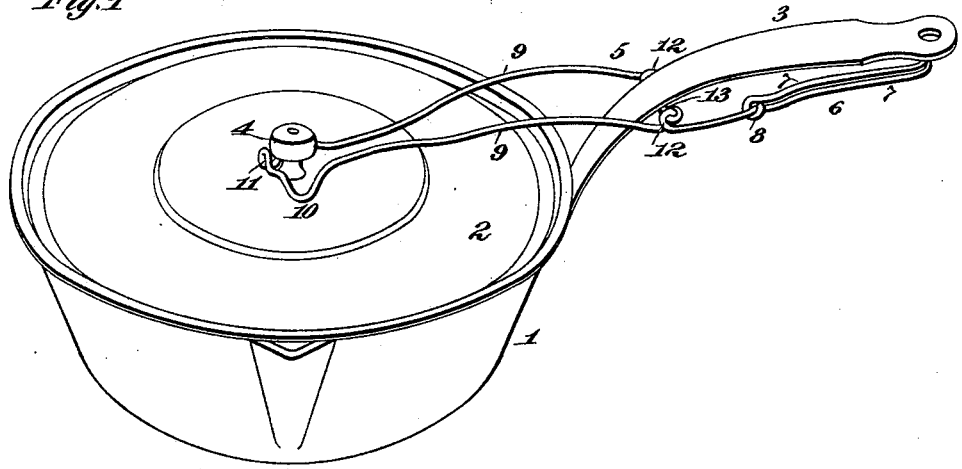
Figure 2:
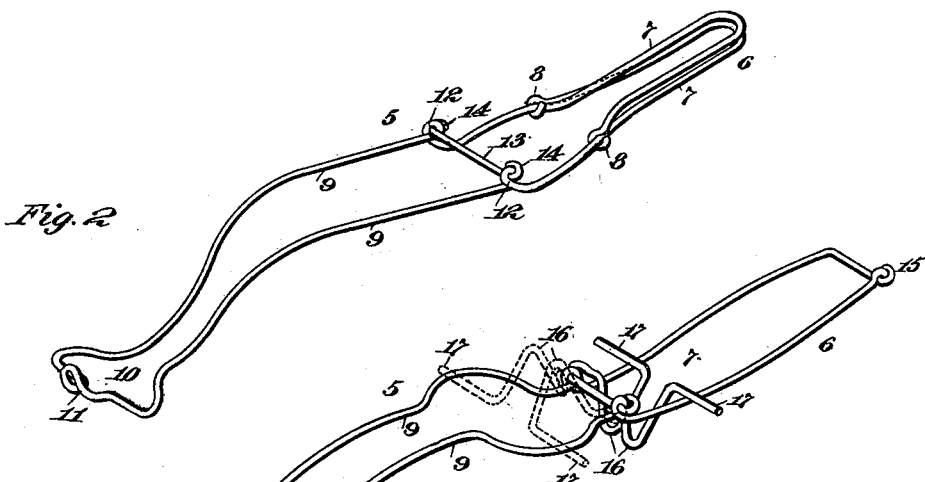

Figure 1 is a perspective view of a common form of lidded cooking utensil, illustrating one form of our improved lid-holder applied in place; Fig. 2, a perspective view of the lid-holder illustrated in Fig. 1; and Fig. 3, a perspective view of a modified construction of lid-holder, illustrating in dotted lines the position of the movable fulcrum therefor.

In all of the above views corresponding parts are represented by the same numerals of reference.

1 represents a cooking utensil—to wit, an ordinary saucepan—having a lid 2 and a handle 3. The lid 2 is usually provided with a knob 4, by which it may be removed.

5 represents a convenient form of our improved lid-holder, which is illustrated as being formed of stiff wire, as is convenient. It will be understood, however, that the said lid-holder may be made of cast metal formed in the proper shape or of sheet metal cut, bent, stamped, or otherwise manipulated into the desired configuration.

The lid-holder shown in Figs. 1 and 2 is essentially of two pieces of wire, the handle 6 being made of the parallel bends 7 7, the ends of the wire being formed into loops 8 8, so as to be held in place. 9 9 represent the two legs which straddle the handle 3 of the utensil, as shown. At the end of the legs is a foot 10, of any suitable form, which bears upon the lid 2, so as to hold it in place. This foot may be looped, as shown, so as to surround the knob 4. Preferably the extreme end of the foot is formed into a toe 11, bent up at the proper angle and which serves as a convenient lifter for a stove-lid. Obviously the device so formed may be conveniently put to use as a poker. Preferably the toe 11 is bent in the form shown, so as to be engaged beneath the head of the knob 4 and surrounding the shank thereof, whereby by reason of such engagement the lid 2 of the utensil may be lifted off when desired. The legs 9 of the lifter are formed with two complete loops or bends 12 12 therein, in which is mounted a cross-piece 13, having bends 14 for holding it in place. This cross-piece 13 bears on the under side of the handle 3 and serves as a fulcrum for the entire device. By straddling the legs 9 over the handle 3, with the foot 10 resting upon the lid and the cross-piece 13 bearing on the under side of the handle 3, it will be seen that the handle 3 of the utensil and the handle 6 of the holder will be grasped simultaneously and that the compression of the hand will exert stress downward upon the lid 2 by the engagement therewith of the foot 10, so as to hold said lid firmly in place.

Figure 3:
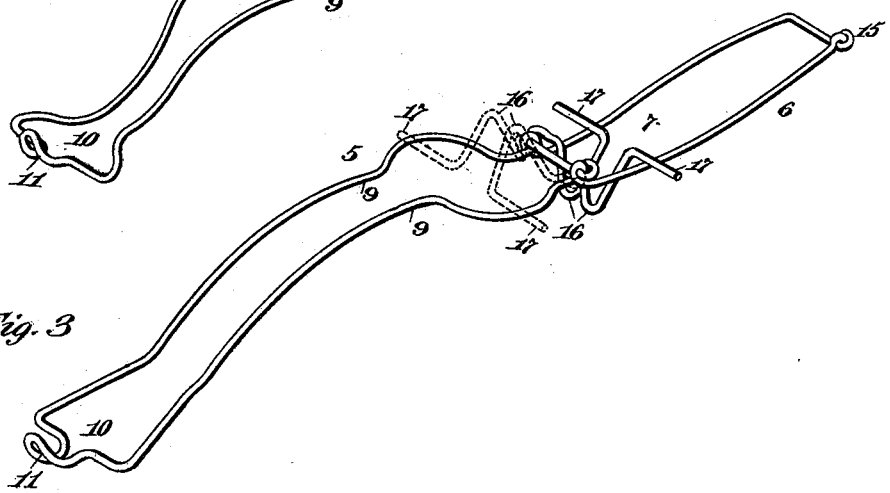

The modification illustrated in Fig. 3 is in most respects identical with the preferred form of device which we have above described. With this modification, however, the handle 6 is not double, but the ends of the wire are secured to the loop 15 at the end of the handle, as shown. With this form of device the cross-piece 13 is continued outward to form two upward bends 16 16, arranged parallel and with two cross extensions 17 17, adapted to rest either upon the handle portion 7 or upon the leg portions 9 below the cross-piece 13, as shown, respectively, in full and dotted lines in said figure. The purpose of this tilting or supplemental fulcrum will be obvious. Where the handle 3 of the utensil is at a sufficiently slight angle with reference to the general plane of the utensil, the cross-piece 13 may be engaged beneath said handle to operate in the same way as the device illustrated in Figs. 1 and 2. If, however, the handle 3 is tilted at a relatively great angle with respect to the plane of the utensil, the supplemental fulcrum is turned over, so that the extensions 17 will rest upon the legs 9 9, whereby the elevations 16 will engage with the handle 3, so as to act as the fulcrum for the device in use.

While the forms of our improved lid-holder which we have described may be conveniently followed in practice, it will be understood that the general construction of the device may be modified without departing from the essential spirit of our invention.

It will also be understood that, if desired, the lid-holder may be permanently secured to the lid 2 by bending the loop 11 firmly around the shank of the knob, whereby the lid and holder may constitute a single article of manufacture. Preferably, however, the lid-holder constitutes a separate removable device, which will be applicable to all lidded culinary vessels having a handle as contradistinguished from a bail.

It will also be understood that in use a lid-holder may be so constructed as to have the end of the handle 6 resting upon instead of beneath the handle 3 of the utensil, the device being thus placed under a slight tension and holding the lid in place automatically instead of by the grasp of the operator, as explained.

Having now described our invention, what we claim as new, and desire to secure by Letters Patent, is as follows:

1. An improved lid-holder for culinary vessels having sidewardly-projecting handles, said lid-holder comprising a handle extending approximately parallel with the vessel-handle, two legs connected to the holder-handle, a fulcrum bearing on the vessel-handle, and a foot connected with said legs and bearing on the lids, substantially as set forth.

2. An improved lid-holder for culinary vessels, said lid-holder comprising a handle, two legs connected thereto, a fulcrum bearing on the vessel-handle, and a foot connected with said legs and bearing on the lid, said foot being provided with an upturned extension adapted to engage a stove-lid, substantially as set forth.

3. An improved lid-holder for culinary vessels, said lid-holder comprising a handle, two legs connected thereto, a fulcrum bearing on the vessel-handle, and a foot connected with said legs and bearing on the lid, said foot being provided with an upturned extension adapted to engage a stove-lid, said extension being in the form of a loop for engagement with a knob on the vessel-lid, substantially as set forth.

4. An improved lid-holder for culinary vessels, said lid-holder comprising a handle, two legs adapted to straddle the handle of the culinary vessel, a cross-piece bearing on the under side of the vessel-handle, and a movable fulcrum carried by said cross-piece, substantially as set forth.

5. As a new article of manufacture, an improved lid-holder made of wire bent to form a handle at one end, with two parallel legs arranged to straddle the vessel-handle, and a foot connected to said legs, said parts being composed of a single piece, and a separate cross-piece mounted in loops formed in said legs for engaging the under side of the vessel-handle, substantially as set forth.

6. As a new article of manufacture, an improved lid-holder made of wire bent to form a handle at one end, with two parallel legs arranged to straddle the vessel-handle, and a foot connected to said legs, said parts being composed of a single piece, and a separate cross-piece mounted in loops formed in said legs for engaging the under side of the vessel-handle, said cross-piece being provided with extensions constituting a movable fulcrum, substantially as set forth.

This specification signed and witnessed this 8th day of December, 1898.

LEON HOAGE.
ALBERT NYVALL.

Witnesses:
JNO. R. TAYLOR,
ARCHIE G. REESE.